Figure 1:
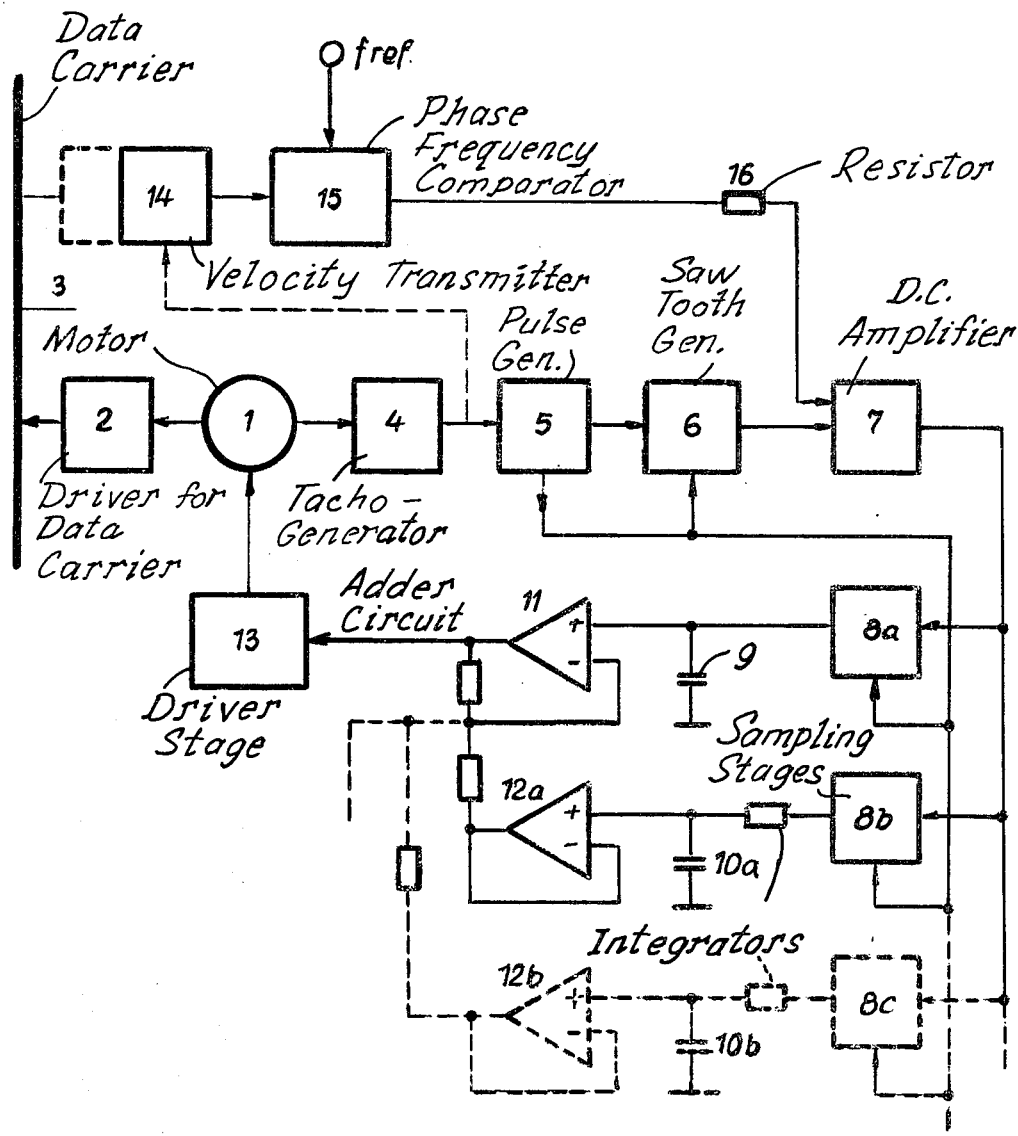

United States Patent [19]

Rothman et al.

[11] 4,238,720

[45] Dec. 9, 1980

[54] EQUIPMENT FOR THE ELECTRONIC SPEED CONTROL OF AN INDUCTION TYPE MOTOR, ESPECIALLY FOR USE WITH DATA STORE MOTORS

[75] Inventors: György Rothman; Ferenc Biró; Gyorgy Babos; Károly Antolik; Ottó Roffa, all of Budapest, Hungary

[73] Assignee: Mechanikai Laboratorium Hiradastechnikai Kiserleti Vallalat, Hungary

[21] Appl. No.: 900,619

[22] Filed: Apr. 27, 1978

[30] Foreign Application Priority Data

May 5, 1977 [HU] Hungary .............................. ME 2065

[51] Int. Cl.$^3$ ................................................ H02P 5/40
[52] U.S. Cl. ................................. 318/800; 318/810; 318/812
[58] Field of Search .................. 318/799, 800, 810, 812

[56] References Cited

U.S. PATENT DOCUMENTS

| 3,821,620 | 6/1974 | Lindberg | 318/799 |
| 4,020,402 | 4/1977 | Storm | 318/799 |
| 4,042,862 | 8/1977 | Franklin | 318/800 |

*Primary Examiner*—Gene Z. Rubinson
*Attorney, Agent, or Firm*—Young & Thompson

[57] ABSTRACT

Equipment for the electronic speed control of an induction-type motor such as the drive motor for a tape recorder, comprises a tachogenerator fixed to the shaft of the motor and operating a pulse generator that has two outputs. A saw-tooth generator has two inputs and one output, one of the inputs of the saw-tooth generator being a start input and the other being a control input. The start input is coupled to the pulse generator, as is also the control input. The latter output of the pulse generator is connected to the control input of the saw-tooth generator and also to the control input of at least one sampling stage. The output of the saw-tooth generator is connected to a dc amplifier, which is in turn connected to the signal input of the sampling stage. The output of the sampling stage is connected to a grounded capacitor and also the the control input of the driver stage. A frequency pulse comparator receives signals from a velocity transmitter that senses the velocity of a portion of the equipment, and compares these signals with a reference frequency to transmit an error signal to the dc amplifier.

3 Claims, 6 Drawing Figures

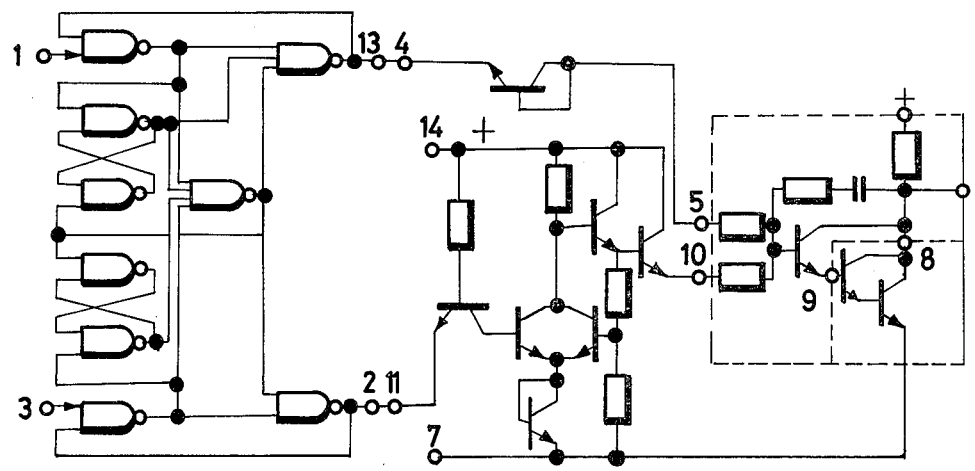
FIG. 3 (*Phase Frequency Comparator 15*)
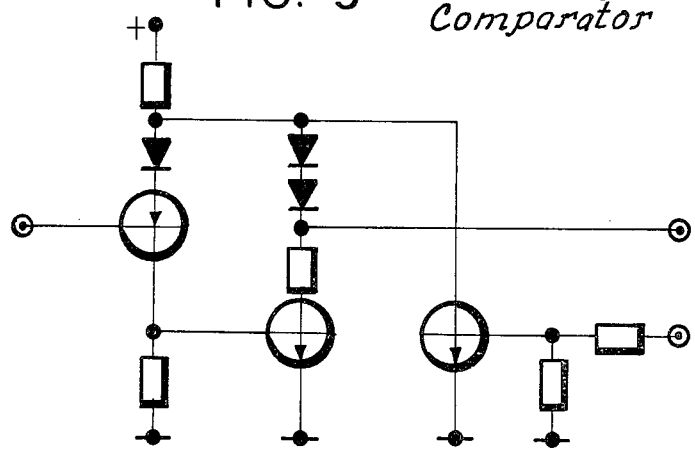
FIG. 4 (*Sampling Stage 8*)
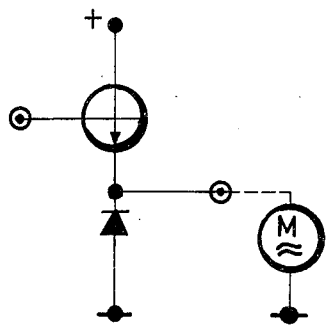
FIG. 5
(*Driver Stage for D.C. Motors*)
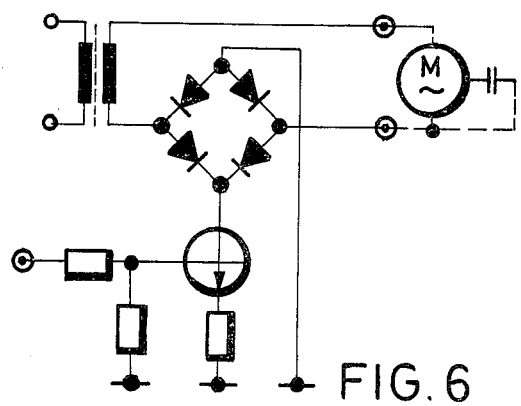
FIG. 6
(*Driver Stage 13 for A.C. Motors*)

EQUIPMENT FOR THE ELECTRONIC SPEED CONTROL OF AN INDUCTION TYPE MOTOR, ESPECIALLY FOR USE WITH DATA STORE MOTORS

The invention is related to equipment offering the opportunity of applying a suitable electronic speed control even to inductive type electric motors, i.e. to motors the speed/voltage characteristic of which are not linear, and with a high dynamic control velocity and within a wide rpm range, and affording, if necessary, even synchronous operation.

Among the uses of speed control circuits equipped with servo motors, one of the most demanding categories is the field of electroacoustic sound recording and reproduction. The invention will therefore hereinafter be described with reference to applications in this field but the invention is not at all restricted to this field of technology. In sound recording, the requirements as to the moving of the sound carrier such as a disk or a magnetic tape are especially severe ones as far as the steadiness of motion is concerned since it affects several characteristics of the reproduced information, especially its sound fidelity, in a decisive manner. If the record is errorless and the reproducing speed is constant but differs from that of the recording, the said speed difference causes a transposition of the tessitura. If the reproduced speed is fluttering, a frequency transposition of varying measure is produced that is known as "wow". The human ear is already sensitive to a fluttering in pitch of not more than a fraction of a percent; the speed of an electric motor that is used for driving sound carrier devices must therefore not flutter more than a fraction of a percent either, even if the load is varies very quickly.

The speed modifying influence of a quickly varying load can, e.g., be diminished by the use of a fly-mass but this measure is disadvantageous as far as the possibility of quickly starting the data carrier is concerned. A more favourable improvement can be obtained by increasing the dynamic or response velocity of the applied speed control system. The speed control becomes specially difficult if the motor operates at a very low speed or at different speeds covering a wide range. This occurs, e.g., in the case of immediately driven disk phonographs or the main motors of multi-speed tape recorders. The accuracy requirements are very high so that usually speed/frequency converters such as tachogenerators are used as speed transmitters and the output frequency of the same is also of a low value since—for practical reasons—only a very restricted increase in the number of the dots applied on the tacho disk can take place. A magnitude of $10^3$ can not be exceeded even if using optical devices, and even this magnitude can be obtained only by using very expensive high precision components. A resolution of about $2-3.10^2$ can economically be obtained with expedient dimensions, i.e. the output frequency of the transmitter can at 33 ⅓ rpm not exceed 160 Hz.

There are still greater difficulties if the motor speed must be synchronized with a high precise—or continuously varying—reference frequency (this is, e.g., the case with Xtal controlled devices such as main motors for tape recorders or turntables for use in measuring), or if the speed of the data carrier moved by the motor must be synchronized with the movement of another means or with the time characteristic of a process such as the matching of the run of a motion picture and its accompanying tape. Such procedures include a phase control and such a control circuit contains also an integrating element that may cause liability within the circuit. A similar disturbing effect may occur as a consequence of the delay caused caused by the elasticity of the data carrier.

Under conditions as set forth above, in practice, dc motors with electronic commutation are used nearly exclusively for the drive; the commutation is mostly performed by Hall generators. The application of such means, however, involves numerous disadvantages:
—the rotor is equipped with a permanent magnet of considerable mass so that the inertia moment is also considerable and there is no way to diminish it;
reversing cannot be performed in an easy way;
the motor is expensive;
special commutating electronics are needed;
the torque is non-uniform, even within a single revolution;
if Hall generators are used, the upper limit of the temperature range is relatively low.

It has been examined whether there is a possibility to use instead single-phase induction motors or hysteresis motors for the purposes mentioned above since it is a well known advantage of such motor types that they are very reliable over a long lifetime, and practically no maintenance work is needed. Moreover, the said motor types show features which are also very advantageous for their application in this field:
their inertia moment is of medium value,
they an be reversed in a simple way,
they are considerably cheaper,
no special commutating electronics are needed,
their torque is uniform over a whole revolution;
the upper limit of the working temperature range is much higher.

However, there is an essential disadvantage with such motors: their speed over a wide range can not be controlled either by varying the voltage or by varying the mains frequency. The invention is based on the following concept: although the speed of such motors is not a linear function of the mains voltage, the torque/voltage characteristic is a linear one and these motor types can therefore be considered—as far as their function in the control loop is concerned—as torque generators. It can be seen from the theory of automation that a stable, quick, closed loop control means devoid of damaging transient effects can be provided for the said torque generating characteristics only if there is no supplementary element of integrating effect in the control circuit.

The simultaneous presence of two integrating elements in the control circuit would for the phase shift they are effecting and the positive feedback effected by the phase shift, cause a tendency to transient swinging and perhaps to instability. There are of course known compensating elements in this field of technology that can be applied in order to stabilize a control circuit that was initially liable to instability but:
the use of a PI-element (proportional-integral action) involves a decrease in operation velocity of the control circuit;
a PID (proportional-integral-derivative action) or a PD (proportional-derivative action) element would cause a damaging increase in the high frequency noise superposed upon the control signal.

It has already been mentioned that the signal frequency of the tachogenerator is very low and this disadvantageous feature leads also to very severe requirements to be met by the frequency-discriminator, especially considering that the characteristic of the discriminator must be linear over the whole working range, and a saturation characteristic is necessary near 0 frequency as well as near ∞ frequency. There are numerous known embodiments of—not selective—discriminators that can meet the above requirements. One of them is a chain consisting of a high-pass or low-pass filter and a rectifier. Another type is the counting type discriminator converting the input signal into a uniform pulse series and establishing the average value of the same. The mentioned solution and other ones similar to them as far as our purpose is concerned are of course not free from individual disadvantages (amplitude-dependence, low slope values, etc) but there is a common disadvantage with all of them: all of them have a supplementary integrating effect on the control circuit.

There is, however, a known solution solving the problem in a suitable manner. It comprises a D/A converter, an oscillator, a counting chain and a store. The counter counts the pulses representing the oscillator frequency but the counter is keyed by pulses formed from the input signal. The content of the counter as present immediately before keying is supplied—preceding the key operation—into a memory and—thence—into the D/A converter. The converter supplies a dc voltage inversely proportional to the frequency of the input signal. The solution works in a suitable manner but it is disadvantageous for its complexity but mainly for the considerable costs of a D/A converter of the required accuracy.

The equipment according to the invention is adapted to meet all the said requirements in a satisfactory manner but avoids the disadvantages set forth above. The whole control circuit can be built in a most economical way. Its essential element is a circuit that can be referred to as a measuring and once or several times sampling/storing discriminator since it performs the following operations: the special pulse spacings that appear between two subsequential pulses of a pulse train that is of a periodic character but not necessarily a pulse train of constant pulse repetition time, are in due course measured and one or more samples of the single spacing representing a so-called "momentary frequency" are taken and the sample (in case of multiple sampling the integral of the samples) is stored until—and only until—the value of the "momentary frequency" belonging to the next cycle appears, and an output signal is generated by processing the said samples (sample integrals) generated that is as bare as possible of disturbing interferences as a consequence of a PD compensation of the first or of a higher order (PD or PD$^n$).

In the case of single sampling the same effect is obtained as: in the prior art which is equipped with a D/A converter, a counter, and a store but by way of a much simpler, more reliable cheaper embodiment. If using multiple sampling, the said compensation as mentioned above affords an even better result than that obtainable according to the prior art but the equipment is even then simpler. It is possible, by the invention, to make use of cheap and highly reliable induction type electric motors—notwithstanding the fact that their speed is not a linear function of the supplied voltage—in control circuits of high dynamic velocity, wide speed-range or in circuits designed for a very low speed, and also for circuits performing a synchronization of the operation.

The invention is related to equipment for the electronic speed control of an induction type motor, especially for use with data store motors, comprising a speed transmitter such as a tachogenerator fixed to the shaft of the motor, a reference transmitter and a driver stage supplying the terminals of the motor with a voltage corresponding to the required torque.

The improvement consists in that the output of the said speed transmitter is connected to the control input of a pulse generator with two outputs, the first output being coupled to the starting input of a saw tooth generator and the second output being coupled to the key input of the said tooth generator, the latter comprising also the said reference transmitter, and the second output of the said pulse generator is also connected to the key input of a sampling stage, the output of the said saw tooth generator is connected to the input of a dc amplifier, the latter's output is connected to the signal input of the said sampling stage, and the output of the said sampling stage is connected on the one hand to one plate of a capacitor the other plate of which is connected to a terminal of constant potential such as the earth terminal of the equipment, and on the other hand—directly or indirectly—to the control input of the said driver stage.

The equipment as specified above performs a single sampling, and produces the same results as the equipment known to date but by a simpler construction. If a multiple sampling is needed in order to gain a compensation to avoid interferences, an embodiment is used wherein an arithmetic adder circuit is inserted between the output of the said sampling stage and the control input of the said driver stage, to the positive input of which is connected the output of the said sampling stage, and the equipment comprises also one or more supplementary sampling stages the corresponding input(s) of which are also connected to the output of the dc amplifier and the second output of the pulse generator, respectively, whereas the input(s) of the said supplementary sampling stage(s) is (are) connected (each) to the input of an integrator, and the output(s) of the said integrator(s) is (are) connected (each) to the input of a decoupling amplifier the output of the latter being coupled—over a coupling resistor—to the negative input of the said arithmetic adder stage.

If not only a compensation to avoid interferences is required but also the synchronization of the operation, the equipment also comprises a phase-frequency comparator to one input of which is connected a reference transmitter and to the other output of which is connected a velocity transmitter, and the signal input of the said velocity transmitter is coupled either to the output of the said speed transmitter or to the reproducing element of the data carrier such as the reproducing head of a magnetic tape recorder whereas the output of the said comparator is coupled, preferably through a resistor, to a further input of the said dc amplifier.

The invention will now be described more particularly with with reference to the accompanying drawings showing an embodiment comprising also the optional supplementary components in order to explain the operation of all the embodiments in an easily conceivable manner whereas it will in due course also be specified how the equipment operates without the optional components so that the features of the most general embodiment of the invention are also unambiguously specified.

FIG. 1 shows a block diagram of the whole equipment, and

Figure 2:
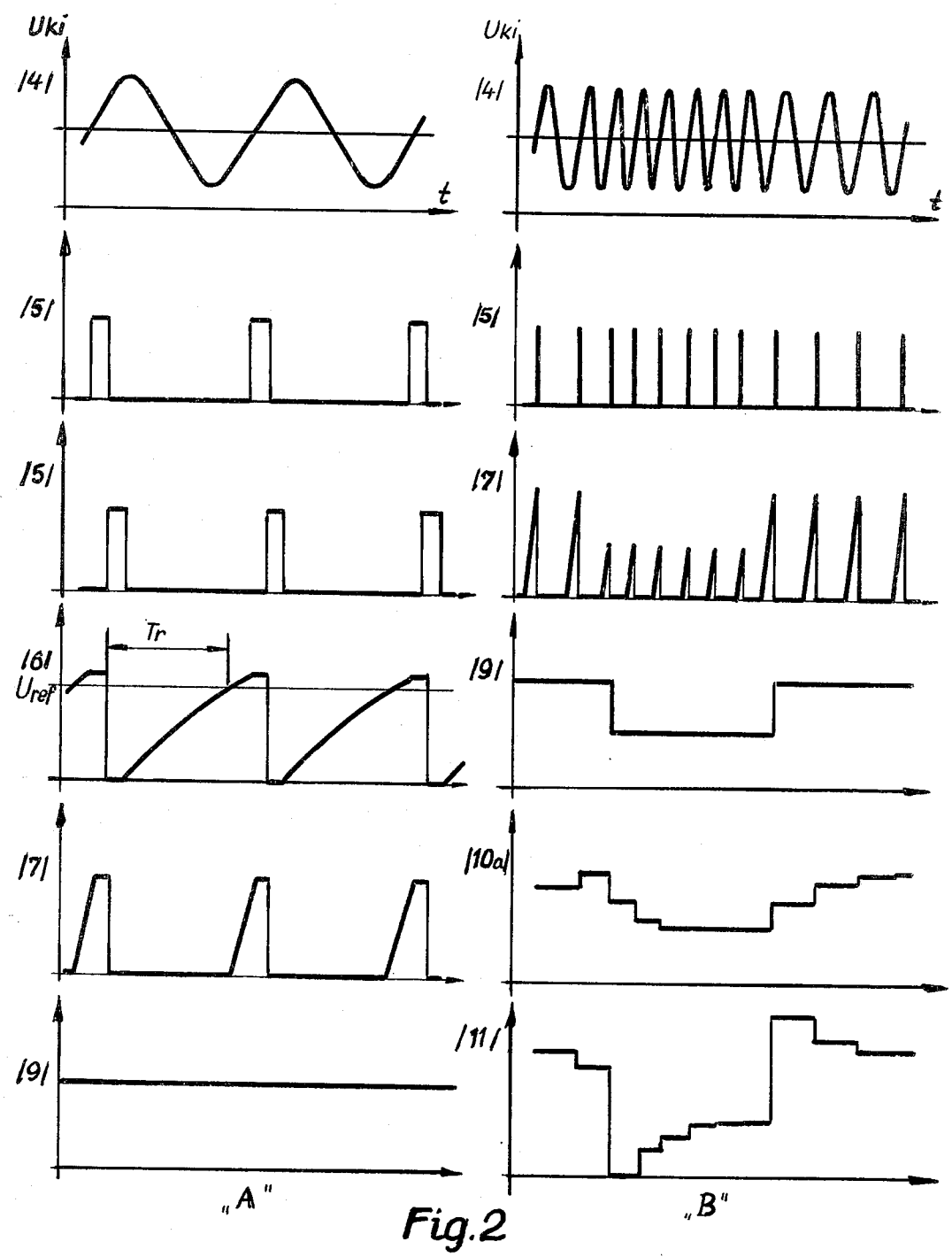

FIG. 2 the output signals appearing at the outputs of the different components as shown in FIG. 1 whereas the "A" side gives the signals appearing at constant motor speed, and the "B" side those appearing if the motor speed is abruptly fluttering. In the latter case, the time axis is accordingly contracted. There is shown a preferred embodiment of the phase-frequency comparator in FIG. 3, te sampling stage in FIG. 4, the driver stage for dc motors in FIG. 5 and for ac motors in FIG. 6.

The equipment according to the invention operates as set forth below:

The motor 1 drives the data carrier 3 over an intermediate element 2 of a type corresponding to the carrier in question. A speed transmitter 4 such as a tachogenerator that is expediently fixed to the shaft of the motor 1 supplies a signal train of a periodicity corresponding with the instantaneous speed of the motor 1. The pulse generator 5 with two outputs converts the said signal train into two pulse trains differing from each other by a phase shifting and supplies each of them to one of its outputs. The pulse train preceding in time can be called the sampling pulse train whereas the subsequent one can be called the trigger pulse train.

The trigger pulses perform the triggering of a—triggered and keyed—saw tooth generator 6, i.e. of a circuit the output voltage of which decreases during the trigger pulse and increases after the expiration of the trigger pulse except during the presence of the sampling pulse when the level of the saw tooth signal remains constant. The output signal of the saw tooth generator 6 is supplied to one input of a dc amplifier 7 that is equipped also with another input that is coupled to the output of a reference voltage source. The saw tooth signal amplified by the amplifier 7 appears at the output of the same only if its level exceeds that of the reference voltage. The saw tooth signal increases to this level—reckoned from the instant of triggering—during a time span of $T_r$ called the reference period. (The reference transmitter to be incorporated into the said saw tooth generator 6 can be conventional.) If the triggering of the saw tooth generator 6 occurs more frequently than the said reference period $T_r$, the output signal of the generator 6 cannot increase to the reference level of the dc amplifier 7, thus, the output level of the latter will constantly be O potential. If on the contrary the triggering of the saw tooth generator 6 takes place only after a time span longer than the reference period $T_r$, the part of the saw tooth signal exceeding the said reference level appears—at an amplified level—at the output of the dc amplifier 7. It has already been mentioned that the sampling pulses always precede the trigger pulses of the same cycle. The sampling pulse arrives, thus at the time a peak value is present at the output of the dc amplifier 7. The sampling pulse triggers the sampling stage 8a and the supplementary sampling stages 8b and 8c (if any) and causes the said stages to store the said peak value in the capacitor 9 and into the integrators 10a and 10b (if any). The accuracy of this storing operation is improved by the fact that the sampling pulses also keys the saw tooth generator 6 so that the value of the saw tooth signal and, consequently, of the output signal of the dc amplifier 7 remains at constant level during the sampling operation.

As a consequence of the above, the storing capacitor 9 is always charged to a dc voltage the value of which is proportional to the difference between the time the motor needs for running through a predetermined rotation angle, i.e. the difference between the instant speed of the motor and the reference speed as specified by $1/T_r$. The capacitors of the integrators 10a and 10b, however, are always charged to the integrals of the said peak values. If the motor speed is constant, the level of the dc voltage at the capacitor 9 is also of constant value. If the motor speed is increasing or decreasing, the dc voltage at the capacitor is also stepwise increasing or decreasing. An abrupt change in motor speed will also cause an abrupt change in the voltage at capacitor 9 but with an average delay proportional to the $T_r$ period as usual with ideal sampling means. But the invention affords also the possibility of compensating—in a novel way—the said delay as well as the disturbing integral action introduced into the control loop by the phase-frequency comparator 15 that is used if a synchronization of the motor is needed and that is set forth hereinafter. This compensation consists in diminishing the level of the voltage as present at the capacitor 9 by a value proportional to the levels stored in the capacitors of the integrators 10a and 10b and is performed by an arithmetic adder circuit 11 linked to the outputs of the said integrators 10a and 10b over decoupling amplifiers, preferably operational amplifiers 12 having a gain equal to 1. The necessary proportions of the subtraction can be set by dimensioning the resistor network connected to the negative input of the adder circuit 11 correspondingly whereas the time constants of the compensation can be set by dimensioning the RC-elements of the integrators 10a and 10b correspondingly.

This novel kind of compensation performs a PD action or—in the case of multiple integration-subtraction—a $PD^n$ action and it is also advantageous for a further feature: the output signal remains stepwise being a composite of step-like voltages. It is therefore free from a disadvantageous feature of the PD compensators according to the prior art, viz. that the high-frequency interferences superposed onto the control voltages are increased by them in a damaging way.

The output signal of the arithmetic adder circuit 11 is supplied as a control voltage to the control input of the driver stage 13, and driver stage 13 corrects the torque of the motor 1 between the limits O and maximum dependent on the instantaneous value of the said control voltage.

The setting of the operating speed of the motor 1 can be effected in the control loop on the one hand by setting the values of the RC elements (the so called "reference transmitter") of the saw tooth generator 6 and on the other hand by setting the reference level of the dc amplifier 7 representing the reference period $T_r$. The said RC elements allow a setting over a wide range whereas the reference level can be set only within a narrow one. The latter way can be utilized for the synchronization of the motor operation or, if necessary, the movement of the data carrier 3 by mixing the signal of the phase-frequency comparator 15 into the control loop.

The comparator 15 compares the signal that is derived from the pulse train appearing at the output of the velocity transmitter 14 and representing a frequency proportional to the speed of either the motor 1 or the data carrier 3, with the signal of an external reference transmitter $f_{ref}$. The error voltage obtained by this comparison corrects the reference period $T_r$ and, thus, the controlled speed of the motor 1 or the data carrier 3 in a direction such that the motor 1 or the data carrier 3 will operate with a speed equal to that represented by the external reference signal. If the signal input of the velocity transmitter 14 is coupled to the reproducing means of the data carrier 3, synchronous operation will be obtained as far as the speed of the data carrier 3 is concerned, if it is coupled to the speed transmitter 4, the motor speed will be synchronized. The resultant gain of the control loop can easily be set by setting the gain of the dc amplifier 7; the gain of the auxiliary, phase controlling loop serving a synchronization of the run can be set by the value of the resistor 16 inserted between the output of the comparator 15 and the reference input of the dc amplifier 7, the said resistor 16 constituting an external, supplementary branch of the voltage divider incorporated into the dc amplifier 7 and supplying the reference level within the said amplifier 7.

It can be seen from the above that the phase controlling auxiliary loop comprising the velocity transmitter 14 and the comparator 15 can be omitted in embodiments where there is no need of synchronizing operation. Likewise can be omitted all stages performing multiple sampling, integrating, subtraction if there is no need to perform the PD compensation as set forth above.

The invention is therefore based on the known principles of automation but differs from the solutions according to the prior art by its novel way of generating the control voltage as well as by applying a new method of compensation in order to improve stability and rapid operation of the control circuitry and to avoid disturbing swing effects and a damaging increase of high-frequency interference.

The control equipment according to the invention makes it possible to drive the turntable of a record player or a disk cutting device by, e.g., a hysteresis motor of 1000 rpm nominal speed that can be coupled to the turntable either directly or indirectly but without the use of a gear transmission. The said motor accelerates the turntable to a 33 ⅓ rpm speed within ¼ of a single revolution and the control equipment provides for the maintenance of the speed within a tolerance less than 0.1 percent. The same arrangement can also afford—owing to the rapidity of the control equipment—the automation of a correct start from a chosen syllable or bar of music so that the setting back of the turntable by way of manual turning can be avoided which has been a source of inaccuracy with the systems belonging to prior art such as EMT 928, EMT 930, SL 911, or Philips PRT30.

The invention can advantageously be applied if a controlled direct drive motor without fly-wheel must be used for tape recorders or cassette recorders where a quick start or stop or reversing is required. The control circuit can if needed provide a synchronous operation of the data carrier (magnetic tape) utilizing the pilot-synchronous signal reproduced from the tape or any suitable other reference frequency.

The quick dynamic operation enables the performance of a quick montage without tape cutting or a quick repetition (once or multiple) by use of a conventional circuit.

The equipment according to the invention can preferably be used if audio frequency signals or data coded on audio frequency signals must be recorded or reproduced in an extra-ordinarily reliable manner and a hysteresis motor as specified hereinbefore must directly or indirectly but without the need of a gear transmission be coupled to a special type data cassette such as DC-300 or the like developed for the store of digital data as an especially reliable and expressly high-speed device with internal, elastic tape drive. The drive obtained by such a coupling is two-directional, a speed range of more than 1:10 can be obtained. The acceleration to 60 rpm as well as the reversal needs some hundred ms each, the speed stability is bettr than 0.5% at a change of load equal to 100 grcm. This arrangement can be used for the control of a motor driving the tape according to the pilot-synchronous signal reproduced from the tape even if a supplementary delay appears owing to the elasticity of the internal tape drive of the cassette because the control loop provides for a suitable phase reserve.

This way the control circuit provides not only for a synchronous operation of the magnetic tape but even a part of the wow caused by the cassette is also eliminated.

For the sake of completeness some circuits are set forth more particularly which are used in the equipment but belong to prior art. They can be designed based on technical literature; therefore only one of the possible embodiments is mentioned. The shown Figures can be found in the literature and are given without reference symbols or a particular explanation of the working mode. The simple reference as set forth hereinafter enables those skilled in the art to reduce them to practice without the need of further data.

The term phase-frequency comparator covers the circuits to both inputs of which two signal trains are coupled whereas it supplies at its output a dc voltage proportional to the phase difference between the two input signals if the frequency of the input signals is equal; if the input frequencies are different, the value of the output dc voltage is equal to its upper or lower limit dependent on the sense of the difference, i.e. to which input is the signal of higher frequency supplied. The task can be performed by various known—mostly IC type—circuits. The construction of a widely used embodiment, the IC type MC 4044 of Motorola is shown in FIG. 3.

A sampling device—in the sense of this specification—is a circuit performing a switching operation as a consequence of electronic control signals whereby a signal appearing at its signal input is coupled to its output for the duration of a pulse coupled to its control (sampling) input. The task can be performed using FET elements, different components or transistors. An example of the type mentioned last is shown in FIG. 4. It is also well known in this field.

A driver stage supplies over its output terminals, which, according to the invention, are coupled to the supply terminals of the motor 1, an electric energy the character and the value of which is controlled according to the character needed by the device to be driven (in this case the motor). For proper operation the said control operation is dependent on the value of the signal coupled to the control input of the driver stage. If, e.g., a dc motor is to be driven, the power output of the driver stage is fed by a dc voltage coupled over a low impedance and changing proportionally to the value of the control signal. If a 50 Hz hysteresis motor is to be driven, an ac voltage of 50 Hz periodicity is also over a low impedance coupled to the output whereas its amplitude is also dependent on the value of the control signal. See FIGS. 5 and 6 for dc and ac embodiments, respectively.

What we claim is:

1. In equipment for the electronic speed control of an induction type motor, comprising a motor speed transmitter, a reference transmitter coupled to the motor speed transmitter, and a driver stage supplying the terminals of the motor with a voltage corresponding to the required torque; the improvement comprising a pulse generator (5) having a control input that receives signals from said speed transmitter (4) and two outputs, said reference transmitter comprising a saw-tooth generator (6) having a start input and a control input and an output, a first said output of said pulse generator being connected to said start input of said saw-tooth generator, the second said output of said pulse generator being connected to said control input of said saw-tooth generator, a sampling stage (8) having a control input and a signal input and an output, said second output of said pulse generator being also connected to said control input of said sampling stage, a dc amplifier (7) having an input and an output, said saw-tooth generator (6) being connected to said input of said dc amplifier (7), said output of said dc amplifier being connected to said signal input of said sampling stage (8), a plate capacitor (9), said output of said sampling stage (8) being connected to one plate of said capacitor (9), the other plate of said capacitor being connected to a terminal of constant potential, said output of said sampling stage (8) being also connected to said driver stage (13).

2. Equipment as claimed in claim 1, and an arithmetic adder circuit (11) between said output of said sampling stage (8) and said driver stage (13), said adder circuit (11) having positive and negative inputs, said output of said sampling stage (8) being connected to said positive input of said adder circuit, at least one supplementary sampling stage (8b, 8c) having inputs which are connected to said output of said dc amplifier (7) and to said second output of said pulse generator (5), an integrator (10a, 10b) for each said supplementary sampling stage, said supplementary second stages having outputs that are connected to inputs of said integrators, a decoupling amplifier (12a, 12b) for each said integrator, said integrators having outputs that are connected to inputs of said decoupling amplifiers, and coupling resistor means, the outputs of said decoupling amplifiers being connected through said coupling resistor means to said negative input of said adder stage (11).

3. Apparatus as claimed in claim 1, and a frequency phase comparator (15) having a pair of inputs and an output, said output being connected to a further input of said dc amplifier (7), a velocity transmitter (14) for sensing the velocity of a part of said equipment, said velocity transmitter (14) having an output coupled to one said input of said phase frequency comparator (15), and a reference transmitter ($f_{ref}$) connected to the other said input of said phase frequency comparator for transmitting to said phase frequency comparator an external reference frequency to be compared to the frequency transmitted by said velocity transmitter (14).

* * * * *